(12) United States Patent
Andler

(10) Patent No.: US 11,536,741 B2
(45) Date of Patent: Dec. 27, 2022

(54) METHOD FOR DETERMINING THE TENSION OF A DRIVE BELT

(71) Applicant: Gebr. Bode GmbH & Co. KG, Kassel (DE)

(72) Inventor: Daniel Andler, Niestetal (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 74 days.

(21) Appl. No.: 16/910,503

(22) Filed: Jun. 24, 2020

(65) Prior Publication Data

US 2020/0400705 A1  Dec. 24, 2020

(30) Foreign Application Priority Data

Jun. 24, 2019  (DE) .......................... 102019116913.5

(51) Int. Cl.
  *G01L 5/10* (2020.01)
  *G01P 3/60* (2006.01)
  *G01M 13/023* (2019.01)

(52) U.S. Cl.
  CPC .................. *G01P 3/60* (2013.01); *G01L 5/10* (2013.01); *G01M 13/023* (2013.01)

(58) Field of Classification Search
  CPC .................. G01L 5/04; G01L 5/10; G01P 3/60
  See application file for complete search history.

(56) References Cited

U.S. PATENT DOCUMENTS

| | | | | |
|---|---|---|---|---|
| 10,029,695 B1* | 7/2018 | Gibson | ................ | B60W 10/06 |
| 10,962,428 B1* | 3/2021 | Olszewski | ............. | G01L 5/047 |
| 2004/0017073 A1* | 1/2004 | Pavlov | ................... | B60N 2/002 |
| | | | | 280/806 |
| 2005/0210752 A1* | 9/2005 | Schulte | ................... | E05F 1/046 |
| | | | | 49/360 |
| 2010/0095787 A1* | 4/2010 | Murphy | ................. | B60R 22/48 |
| | | | | 280/801.1 |
| 2018/0119790 A1* | 5/2018 | Kanduri | ................. | F16H 57/01 |
| 2019/0137350 A1* | 5/2019 | Guru | ................... | G01M 13/028 |
| 2021/0101753 A1* | 4/2021 | Kataria | ................. | B65G 43/04 |
| 2021/0270074 A1* | 9/2021 | Andler | ................... | G05B 17/02 |
| 2021/0348974 A1* | 11/2021 | Sekiguchi | ................ | F16H 7/02 |

FOREIGN PATENT DOCUMENTS

| | | |
|---|---|---|
| DE | 102005029791 A1 | 1/2007 |
| DE | 102017124599 A1 | 4/2019 |

* cited by examiner

*Primary Examiner* — Eric S. McCall
(74) *Attorney, Agent, or Firm* — Cantor Colburn LLP

(57) ABSTRACT

A method for determining the tension of a drive belt, wherein the drive belt is provided for transmission of a torque generated by a drive unit to a load, for example, a door leaf of a door system includes a first process step a., the load is moved from a moving state into a rest state. In a following process step b., the motor voltage is recorded during execution of process step a. and the time-resolved motor voltage curve is prepared. In step c., the motor current is determined from the recorded motor voltage or the motor voltage curve and a time-resolved motor current curve is prepared. In a last step d., the time-resolved motor current curve is evaluated and the tension of the drive belt is determined by means of selected curve features of the motor current curve.

10 Claims, 2 Drawing Sheets

METHOD FOR DETERMINING THE TENSION OF A DRIVE BELT

CROSS REFERENCE TO RELATED APPLICATIONS

This application is related to and claims the benefit of German Patent Application No. 102019116913.5, filed on Jun. 24, 2019, the contents of which are herein incorporated by reference in their entirety.

TECHNICAL FIELD

The present disclosure relates to a method for determining the tension of a drive belt. The disclosure further relates to a door system, in particular a sliding door or pivotable sliding door system.

BACKGROUND

Electromechanical systems, such as, for example, motor-driven door systems are frequently used in a permanent and continuous mode and therefore exposed to continuous loads. The present disclosure refers in particular to drive belts used in such systems which are usually provided to transmit a torque generated by a drive unit to a load, in the case of a door system, for example, a door leaf. In the course of the torque transmission, the load can be set in motion, in the case of a door leaf, for example, into an opening or closing movement. As a result of the permanent use of electromechanical systems (for example, in door systems in vehicles for public passenger transport), the drive belts in the systems used there are exposed to a permanent loading.

Damage to drive belts can result in operating impairments of the appurtenant electromechanical system or even in its failure, with the result that there is inevitably also an increased safety risk. Accordingly it is of major interest to develop an efficient status monitoring method for drive belts, which allows an optimized maintenance and a prediction of the tension state. A measure for this can be the tension of the drive belt.

As is generally known, the use of drive belts is not restricted to door systems. This is because drive belts are used in many technical systems. It should be expressly emphasized at this point that the disclosure is not restricted to door systems and also relates to electromechanical systems which are used in other technical areas.

Thus, drive belts are used to a large extent in most diverse industrial applications such as, for example, fans, pumps, compressors etc. During operation (in particular permanent operation), the drive belts are subject to an increasing mechanical fatigue. Accompanying the mechanical loading of the drive belt, the so-called belt slippage can increase (gliding slip or stretch slip), and the same applies in relation to continuously increasing tension losses. Ultimately, the mechanical loads can even result in a shortening of the lifetime of the drive belt and—in the worst case—in a rupture of the drive belt.

In relation to the use of drive belts in door systems already discussed previously, it should be ascertained that a large proportion of the door systems used today in means of transport used for public passenger transport (this means wheeled vehicles, e.g. coaches, as well as rail vehicles, e.g. trams, underground systems, trains etc.) are based on the use of drive belts. In door systems the main function of the drive belt relates to imparting a movement to the door leaf, namely by way of transmitting a torque generated by a drive unit (e.g. a motor) to the door leaf. By adjusting the amplitude and direction of the acting torque, door leafs can be accelerated in their movement, braked and reversed in their direction of movement.

The same applies in principle to the use of drive belts in entry systems such as sliding or folding step systems. In this case, a horizontal movement of a sliding step, for example, in the direction of a passenger platform (and conversely) can be imparted via drive belt. In folding step systems the imparted movement relates to the folding-in and out of the folding step. In the said cases the drive belt is usually guided via deflecting rollers (or pulleys), for example, two deflecting rollers and is connected via suitable mechanical connecting elements well known from the prior art both to the drive unit or an appurtenant output shaft and to the door leaf (or the sliding step) which is to be seen as the load. That part of the drive belt pulled by the drive-side pulley (and under tensile stress) is also designated in the technically usual manner as load strand, the opposite part as empty strand.

Depending on the type, material and size, the tensile stress required for reliable operation of an electromechanical system can vary. As already described previously, the tensile stress varies principally with advancing lifetime of the drive belt in the course of the mechanical loads acting on the drive belt during operation.

Furthermore, the tensile stress is influenced by the temperature and natural, material-specific ageing processes. Accordingly drive belts have a tolerance range for the tensile stress in which a reliable operation or a reliable use of the drive belt is ensured. Insofar as there is talk of a "tension" within the framework of the present disclosure, this should primarily be understood as a tensile stress or belt tension of the drive belt.

In order to avoid a malfunction of the drive belt during operation, there are routine maintenance methods which include monitoring and adjusting the belt tension. A further concept which can supplement or replace routine maintenance is status-oriented maintenance. Anomalies or malfunctions of the drive belt can thereby be identified before this actually results in damage or failure of the drive belt.

Two commonly used methods are known from the prior art in order to measure the tensile stress of a drive belt. The most commonly used method is measurement of the tensile stress by means of the vibration frequency. The higher the frequency, the higher is the tensile stress. However, this method is not suitable for real-time measurements during active operation (i.e. using the drive belt in a running system, for example, a door system) since it requires a specific stimulation of the drive belt in order to trigger the vibrations required for the measurement. Furthermore, such a measurement method requires the use of a suitable sensor which must be placed in the vicinity of the drive belt. In addition, it must be ensured that the drive belt is located in a static position during the measurement without mechanical loading. This method has a high precision and is used as standard in a frequency range from 10 to 300 Hz. A disadvantage here is that additional hardware (sensors, apparatus for transmission of vibrations) is required which is associated with an additional expenditure.

The other commonly used method is measurement of the increase in belt length by tensioning the drive belt. This method is less complex and costly than the first method but a disadvantage is the lower accuracy. Furthermore, this method cannot be used after the belt has already been tensioned. Such a method is usually used for span widths greater than 1 m.

Another possibility for determining the tension of a drive belt relates to arranging a strain gauge strip directly inside the drive belt (or in the appurtenant mechanical structure which is tensioned with the same force as the drive belt). When implementing a strain gauge strip directly in the drive belt, the belt must be opened (e.g. cut open) and put back together again or closed with the strain gauge strip. Such a procedure is relatively complex and requires manual working steps. The other possibility relates to implementing the strain gauge strip, for example, in the mechanism of a tensioning device of the drive belt, e.g. a screw. This method enables a quasi-direct measurement of the belt tension.

However, the use of strain gauge strips is accompanied by several disadvantages. On the one hand, the measurement accuracy of strain gauge strips is strongly temperature-dependent, on the other hand they are relatively sensitive to mechanical loads. When implementing or embedding such strain gauge strips in a drive belt, the latter is physically modified by embedding this sensor element, i.e. the embedding can influence the physical properties (for example, the tensile stress) and thus result in measurement inaccuracies and even losses of performance of the drive belt. Finally, such a measurement (based on strain gauge strips) requires a separate electronic device in order to evaluate the signals coming from the strain gauge strips, for example, comprising a Wheatstone bridge and an amplifier. Such a method can only be used for test purposes.

SUMMARY

Accordingly, the present disclosure provides a method for determining the tension of a drive belt which allows an automated monitoring of the tension state during active use of the drive belt in an electromechanical system, which is cost-effective compared to the methods known from the prior art, and which does not adversely affect the physical properties of the drive belt.

Furthermore, the present disclosure provides a door system which is adapted to execute the method according to the disclosure and achieve the aforesaid object.

In order to achieve these advantages, a method is provided for determining the tension of a drive belt, wherein the drive belt is provided for transmission of a torque generated by a drive unit to a load, the method including the steps of moving the load from a moving state into a rest state; recording the motor voltage during the execution of process step a. and preparing a time-resolved motor voltage curve; determining the motor current from the recorded motor voltage or the motor voltage curve and preparing a time-resolved motor current curve; and evaluating the time-resolved motor current curve and determining the tension of the drive belt by selected curve features of the motor current curve, wherein the evaluation is made in the course of the evaluating step by an algorithmic evaluation, which is based on selected curve features of the motor current curve, which characterize the motor current curve after reaching the load in the rest state.

A door system is provided having a door leaf, a drive unit, a drive belt provided between the drive unit and the door leaf and a processing and control unit, wherein the drive belt is adapted to transmit a torque generated by the drive unit to the door leaf wherein the door system is adapted to execute the foregoing method.

The present disclosure affords the technical solution in order to provide a status-oriented maintenance method for monitoring the tension or tensile stress of a drive belt. The use of special sensors is not required within the framework of the disclosure.

As already mentioned, the present disclosure relates to a method for determining the tension of a drive belt, wherein the drive belt is provided for transmission of a torque generated by a drive unit to a load, for example, a door leaf of a door system. In this case, the method according to the disclosure comprises at least the steps described hereinafter:

In a process step a., the load (in the example of a door system: a door leaf of a sliding door system, a pivotable sliding door system or a swing door; in the example of a step system: a sliding step or a folding step) is moved from a moving state into a rest state. During execution of process step a., the motor voltage is recorded in a process step b. For this purpose, a suitable measuring unit can be provided in the region of the motor, for example, a voltage meter. Other methods for recording the motor voltage can also be used within the framework of the method according to the disclosure as long as the motor voltage is recorded shortly before, during and after reaching the rest state of the load. Within the framework of process step b. a time-resolved motor voltage curve is created or prepared from the recorded motor voltage or the motor voltage data. In the motor voltage curve the motor voltage is plotted on the ordinate and the time on the abscissa of a two-dimensional coordinate system. However, the data can equally well be provided in table form.

The time-resolved motor voltage curve relates to the motor voltage of a motor assigned to the drive unit. The precise construction, type, size etc. of the motor is irrelevant in this case. The motor voltage curve can be determined by a processing and control unit which is either integrated in the drive unit or a surrounding component and is connected by means of signal technology (in a cable-free or cabled manner) to the measurement unit to record the motor voltage. The motor voltage curve can also be provided by an external processing and control unit which is connected to the drive unit or the measurement unit by means of signal technology (for example, via a cable-free signal connection). In this case, it can additionally be provided that in the region of the drive unit and/or the measurement unit, microcontrollers are provided which are in signal communication with the external processing and control unit via suitable interfaces.

According to the disclosure, it can be provided to record or detect the motor voltage continuously, i.e. permanently or however only in a defined time interval shortly before, during and after reaching the rest state of the load. It can furthermore be provided to store (intermediately) the recorded data temporarily on the processing unit or a memory unit assigned to the processing unit.

In a further process step c. the motor current is determined from the recorded motor voltage or the motor voltage curve and a time-resolved motor current curve is prepared. The motor current curve has the same time dimension as the motor voltage curve. The motor current is preferably determined computationally, optionally with the assistance of further characteristic parameters.

In a further process step d. the time-resolved motor current curve is evaluated and the tension of the drive belt is determined by means of selected curve features of the motor current curve. The evaluation can also be made by the aforesaid processing and control unit which can be integrated in the drive unit or arranged externally thereto. For example, a server of a processing centre can also be understood as external processing and control unit. The data are in this case preferably transmitted to the server by way of a mobile and cable-free data transfer.

The present disclosure is based on the fact that the motor voltage in electromechanical systems is proportional to the rotational speed of the motor (as part of the drive unit) whereas the motor current is proportional to the torque generated by the drive unit. As already mentioned, a torque generated by the drive unit or the motor (therefore ultimately energy) can be transmitted via the drive belt to the load which is also operatively connected to the drive belt. Since the load comprises a non-negligible net mass, sufficient energy must be provided to convey the load from the rest state into a moving state and accelerate it to a specific speed. The method according to the disclosure, however, in particular makes use of the change from a moving into a rest state to determine the tension of the drive belt.

The operating mode of the method according to the disclosure is explained hereinafter, for example, with reference to a door system. This can, for example, comprise a sliding door system with at least one door leaf (single-leaf sliding door), wherein the door leaf should be seen as the load in the sense of the terminology of the present disclosure. Equally well this can comprise a double-leaf door system composed of two door leafs. In such a case, both door leafs can each constitute a load in the sense of the disclosure. In this case, the method can be configured to be redundant since if both door leafs are moved via a separate drive or drive belt, in the sense of the disclosure it is desirable to monitor the tension of both drive belts. The method according to the disclosure can also be used in pivotable sliding door systems (whether this be single-leaf or double-leaf). It is also expressly emphasized that the method according to the disclosure is not restricted to door systems and can also be readily used in step systems. In such a step system (e.g. sliding step system or folding step system), an extendable and retractable sliding step (or an extendable and retractable folding step) can be seen as the load in the sense of the disclosure to which a force required for the movement is also transmitted using a drive belt.

During a movement of the load (e.g. the door leaf) from the rest state into the moving state, the drive unit (which has accelerated the load to its reference speed or desired speed) must only deliver a sufficient energy to keep the load in motion. The torque provided by the drive unit and acting on the drive belt is adapted so that it is possible to compensate for the frictional forces occurring in the drive unit (motor, transmission). After acceleration of the load (together with its net mass) this becomes the source of kinematic energy.

Since the drive belt provides an elastic-mechanical connection between load and drive unit (or motor), the tension of the drive belt can be determined according to the disclosure by means of motor characteristic values.

The method according to the disclosure can be implemented independently of a specific type of motor or an electronic unit for driving the motor. In the boarding systems developed by the applicant, for example, brush-operated DC motors are frequently used wherein the electronic unit for driving the motor normally comprises four-quadrant DC-DC converters which in technical jargon are also designated as H-bridge converters or motor bridges. In addition, those switches pertaining to the DC-DC converter can be of an arbitrary nature (provided they are suitable) but this document will designate the switches as Mosfets.

In the said boarding systems (for example, a door system), the appurtenant door leaf can have two end positions, namely a closed and an open end position. In the closed end position it is not possible to enter through the doors but this is possible in the open end position. Both end positions are characterized in that the resulting motor voltage in the drive unit is zero, i.e. the motor is electrically interrupted by the semiconductor pertaining to the DC-DC converter. The sliding step or folding step assigned to a step system can have two such end positions (or rest positions), namely an extended or a retracted position.

As already mentioned, the load generates a kinetic energy during its movement (as a result of the moving net mass). Neglecting the drive unit, this kinetic energy can also be considered to be remanent energy which is reflected, inter alia, in the motor current. In relation to electrical characteristic values, the motor current can change its sign during movement of the load. In principle, the current can flow from the drive to the source and back to the drive. After the end of the movement process, i.e. upon reaching the load in a rest position, the current can decay as a result of the elastic characteristic of the system until the remaining energy is reduced.

Shortly before reaching the rest state of the load (i.e. for example an open position or a closed position of a door leaf), a "minimum voltage" is required to drive the door leaf even shortly before reaching the rest state at a certain (slow) speed and a certain torque. The speed or torque required for this are predefined by the processing and control unit.

After reaching the rest state, the circuit of the drive unit provided to provide the torque is interrupted. Even if the "minimum voltage" is small compared with the nominal voltage of the drive unit, this changes very rapidly and results in a stopping of the drive.

Within the framework of developing the present disclosure, it was ascertained that after reaching the end position, a certain intrinsic energy remains in the system (in particular in the drive belt). This also acts on electrical characteristics of the drive unit and an appurtenant motor, for example, in the form of characteristic curve features of the motor voltage curve or motor current curve. The tensile stress of the drive belt can be deduced from these features.

After switching off the motor, the said intrinsic energy is relayed from the drive belt to the drive unit or the motor, namely as long as the energy has dropped to a stationary level. The remanent energy of the drive therefore depends (at least temporarily) inter alia on the tensile stress of the drive belt. In principle, the tensile stress of the drive belt acts directly on the elasticity of the system and therefore on the entire damping characteristic. On the basis of this relationship, the tensile stress of the drive belt can be measured indirectly. As explained previously, a wear state of the drive belt can be deduced from the tensile stress, for example, by comparison with a predefined initial value, tabular or empirical values of the tensile stress. Predictions on the tension of the drive belt can therefore be made from the curve features of the motor current curve or the motor voltage curve in a time interval located temporally after reaching the rest position of the load.

The electrical current is a physical quantity with high variability. The amplitude and the form of the motor current curve depend on many different factors. Since the time-resolved motor current curve or the curve features contained therein are evaluated preferably algorithmically to determine the tension of the drive belt, a series of boundary conditions must be taken into account in the evaluation. When using the method in a door system, the main factors to be taken into account are the temperature and the inclination of the door system. The same can also apply to step systems. These external factors change the relationship between current and the tensile stress of the drive belt. In order to compensate for this, an evaluation algorithm based on artificial intelligence can be used, which allows a processing of multivariable data sets.

Despite the fact that the door leafs pertaining to a door system reverse very rapidly and suddenly upon identifying an obstacle, within the framework of the present disclosure in order to determine the tension of the drive belt, only the "normal" end position cases are taken into account, especially the end position of the door leaf(s) pertaining to the open state of the door system and the end position of the door leaf(s) pertaining to the closed state of the door system. In the last-mentioned closed end position of the door leaf(s), further effects such as the influence of a door locking or a lock should also be taken into account.

The subclaims relate to advantageous embodiments and further developments of the present disclosure. The features specified in the subclaims can be used in any combination to further develop the method according to the disclosure and the system according to the disclosure insofar as this is technically possible. This also applies if such combinations are not expressly illustrated by corresponding back references in the claims. In particular, this also applies beyond the category limits of the patent claims.

According to a first embodiment of the disclosure, the load comprises a door leaf of a single- or double-leaf sliding door or pivotable sliding door system. Equally the load can also comprise a door leaf of a swing door system. Furthermore, a sliding step or folding step of a sliding step system or folding step system can also be considered as load in the sense of the present disclosure.

According to a further embodiment of the disclosure, the moving state relates to an opening or closing movement of the door leaf. In this case, the rest state can in particular relate to an open state of the door leaf. Alternatively the rest state can relate to a closed state of the door leaf.

Equally the moving state can however relate to an extension or retraction of a sliding step. Likewise the moving state can relate to a folding-out or folding-in of a folding step. In these cases, the rest state either relates to a retracted or folded-in state of the sliding step or folding step or alternatively to an extended or folded-out state of the sliding step or folding step.

According to an advantageous embodiment of the disclosure, the evaluation is made in the course of process step d. by way of an algorithmic evaluation, wherein the evaluation is based on selected curve features of the motor current curve, which characterize the motor current curve after reaching the load in the rest state. Accordingly, the evaluation can be based on those curve features of the motor current curve which characterize the motor current curve in a state in which the circuit of the motor is interrupted. In particular, this comprises those curve features which follow from intrinsic energy stored in the drive belt. Furthermore, it can be necessary to take into account the influence of temperature in the algorithmic evaluation. Temperature can mean an outside temperature as well as a motor temperature. In order to avoid repetitions, reference is made in this regard to the preceding description.

According to an advantageous embodiment of the present disclosure, the curve features of the motor current curve can be selected from the curve slope, amplitude, amplitude difference or further curve features that can be determined mathematically or geometrically (e.g. derivatives, area calculations, integrals etc.). In particular, this can comprise those curve features which represent the intrinsic energy relayed by the drive belt in the direction of the drive unit in the best possible manner and are thus directly connected to the tensile stress of the drive belt.

According to a further advantageous embodiment of the disclosure, the algorithmic evaluation can be based on boundary conditions for the curve features of the motor current curve which define one or more tensions of the drive belt. This can comprise maximum or minimum values of individual curve features (for example, a maximum or minimum amplitude at a predefined time point), wherein these maximum or minimum values specify limiting values up to which a reliable operation of the drive belt is still ensured.

According to a further advantageous embodiment of the present disclosure, it can be provided that the boundary conditions relate to the curve behaviour or the curve shape, amplitude values, amplitude differences or curve slopes in a predefined time interval after reaching the rest state. These boundary conditions can be specified or determined, for example, in test methods preceding the use of a drive belt (also already in the course of the product development).

According to a further advantageous embodiment of the disclosure, the method according to the disclosure can be executed during active operation of the drive belt. A continuous status monitoring of the tension of the drive belt is thus made possible.

As already mentioned initially, the disclosure provides a door system according to the claims. The said door system can in particular comprise a sliding door system or a pivotable sliding door system (a pure swing door system also comes into consideration). The door system comprises a door leaf, a drive unit, a drive belt provided between the drive unit and the door leaf and a processing and control unit, wherein the drive belt is adapted to transmit a torque generated by the drive unit to the door leaf. The door system is adapted to execute the method for determining the tension of a drive belt, wherein the drive belt is provided for transmission of a torque generated by a drive unit to a load, the method including the steps of moving the load from a moving state into a rest state; recording the motor voltage during the execution of process step a. and preparing a time-resolved motor voltage curve; determining the motor current from the recorded motor voltage or the motor voltage curve and preparing a time-resolved motor current curve; and evaluating the time-resolved motor current curve and determining the tension of the drive belt by selected curve features of the motor current curve, wherein the evaluation is made in the course of the evaluating step by an algorithmic evaluation, which is based on selected curve features of the motor current curve, which characterize the motor current curve after reaching the load in the rest state. In this case, the door leaf should be considered as the load in the sense of the present disclosure, accordingly all the configuration variants mentioned in this respect within the framework of the description of the method forming the basis of the disclosure are also included in the scope of the door system according to the disclosure. The disclosure can also be achieved, as it were, with a step system comprising a sliding step or a folding step, a drive unit, a drive belt provided between the drive unit and the sliding or folding step and a processing and control unit, wherein the drive belt is adapted to transmit a torque generated by the drive unit to the sliding or folding step. The step system is further adapted to execute this.

BRIEF DESCRIPTION OF THE DRAWINGS

Further advantages, configurations and further developments which are related to the method according to the disclosure or the door system according to the disclosure are explained in detail with reference to the exemplary embodiments described hereinafter. These are intended to illustrate the disclosure to the person skilled in the art and put him in the position to execute the disclosure without however restricting the disclosure. The features described with reference to the exemplary embodiments can also be used to further develop the method according to the disclosure. In connection with the description of the said exemplary embodiments, reference is made to the following figures by means of which the method according to the disclosure or the system according to the disclosure is explained in more detail. In the figures.

DETAILED DESCRIPTION OF THE DRAWINGS

Figure 1:
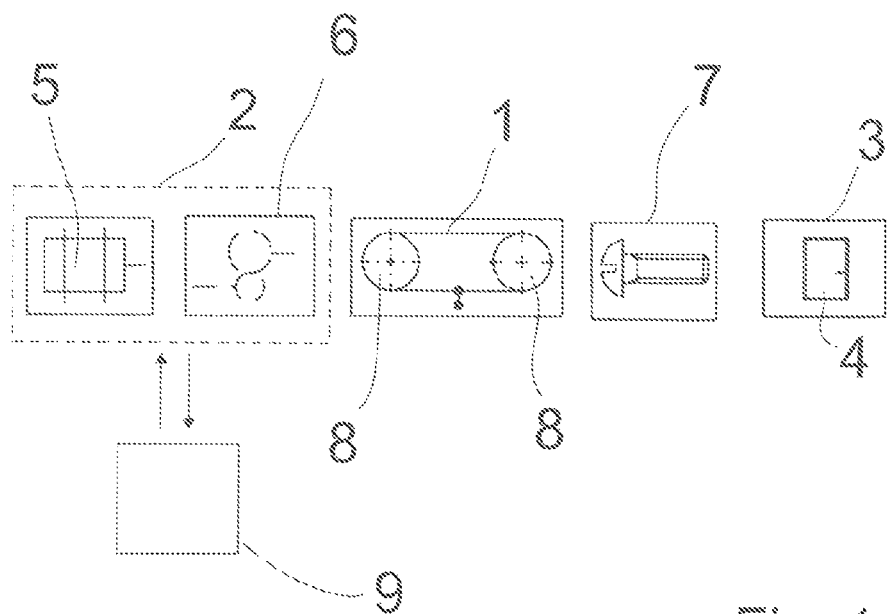
FIG. 1 shows a schematic view of the essential components of the door system according to the disclosure.

FIG. 1 shows in a schematic diagram the components involved in the method according to the disclosure. The components shown can readily comprise components of the door system claimed with the disclosure. Furthermore, the system components reproduced in FIG. 1 can also be applied generally to any type of electromechanical systems.

As already described, the method claimed with the present disclosure comprises a method for determining the tension of a drive belt 1. The drive belt 1 is arranged between a drive unit 2 and a load 3 and is used to transmit torques generated by the drive unit 2 to the load 3. The transmission of torque can for example result in a movement of the load 3. As it were, however a movement of the load 3 can also be braked by selecting the torque, for example, by reducing the acting torque or reversing the sign.

The drive belt 1 runs (in the example shown here) over two deflecting rollers or pulleys 8. One of the deflecting rollers 8 is operatively connected to a transmission element 6 starting from the drive unit 2. The transmission element 6 can, for example, comprise a mechanical shaft. The transmission element 6 in turn is driven by a motor 5 and, for example, set in a rotational motion. The rotational motion is transferred to a drive-side deflecting roller 8 with the result that ultimately the drive belt 1 and a load 3 operatively connected to the drive belt 1 via a mechanical transmission member 7 is set in motion. The load can, for example, by a door leaf 4 of a door system.

Within the framework of the disclosure described here, the motor 5 and the transmission element 6 should be interpreted as a common drive unit 2. The drive unit 2 is connected by means of signal technology to a processing and control unit 3 (in a cable-free or cabled manner). Via this unit, on the one hand the entire movement sequence of the basic electromechanical system (e.g. door system) can be controlled and regulated, on the other hand the method according to the disclosure (or essential steps of the method) can be executed using the processing and control unit 9.

Figure 2:
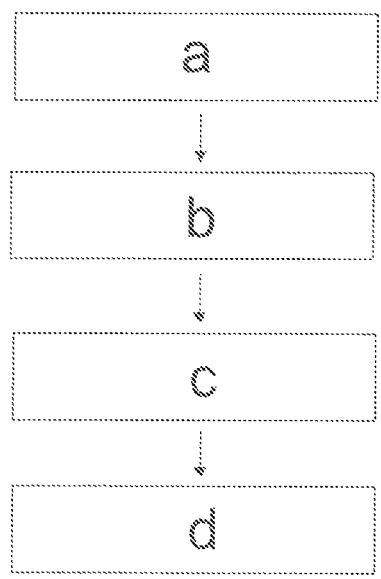
FIG. 2 shows a schematic view of the process sequence according to the disclosure.

FIG. 2 shows the process steps of the method forming the basis of the disclosure in a highly schematic diagram.

In a first process step a. the load 3 (for example, a door leaf 4 of a door system) is brought from a moving state into a rest state. In relation to a door leaf 4 of a door system, such a moving state can be understood as that state to which the door leaf 4 is subject during an opening or closing movement. A rest state is to be understood in the sense of process step a. as each state in which the load 3 does not undergo any movement, in relation to a door system a rest state is to be understood, for example, as the resting of the door leaf 4 in its open or closed position. The movement of the load 3 from the moving into the rest state is imparted via the transmission member 7 connected to the load 3, the drive belt 1 connected thereto and ultimately the drive unit 2, for example, by reducing the acting torque or by reversing the sign.

In a process step b. the motor voltage is recorded during the execution of process step a. (i.e. during movement of the load 3 from a moving into a rest state). The recording can be accomplished by means of a suitable voltage measurement unit to which more precise reference is not made within the framework of this disclosure. In principle, any recording means suitable for the time-resolved recording of the motor voltage comes into consideration for this. The recorded data are preferably provided in the form of a time-resolved motor voltage curve but can also be provided in other data reproduction forms (tables of values etc.) or data formats.

In a process step c. following process step b., the motor current is determined from the recorded motor voltage or the motor voltage curve. A time-resolved motor current curve is then prepared, which corresponds in its time dimension to the motor voltage curve. The data forming the basis of the motor current curve can also be provided in other data reproduction forms (tables of values etc.) or data formats.

In a process step d. the time-resolved motor current curve is evaluated. In this case, the tension of the drive belt 1 is determined by means of selected curve features of the motor current curve. The evaluation can be made, for example, by means of a processing and control unit 9 but also can easily be made by means of an external processing unit. In the latter case, it must however be ensured that the data required for the evaluation (in particular a motor current curve) are transmitted to the external processing unit.

The suitability of the present inventive approach (determining the tensile stress of the drive belt 1 by means of motor current curves) was investigated and validated experimentally, especially using a BIDS Alstom X60B door. The appurtenant experimentally determined motor current curves are reproduced in FIG. 3 whilst the corresponding motor voltage curves are shown in FIG. 4.

In the experimental investigations, various tensions of the drive belt were investigated and validated. For reference purposes the present or set tensions were measured with a transducer in a frequency domain proportional to the tensile stress. For this purpose the drive belt was set in vibration and the vibration frequency was measured using a transducer. In this case, different vibration frequencies represent different tensile stresses of the drive belt. The higher the frequency, the higher the tensile stress. Motor voltage curves and motor current curves were recorded or determined in parallel at the different vibration frequencies (according to the previously described process steps a. to d.).

A normal tension for the drive belt of the said door system yields a vibration frequency between 46 and 50 Hz. In the present case, frequencies between 29 Hz and 67 Hz were investigated. The present tensile stress of the drive belt 1 acts on the curve shape both of the motor current curve and of the motor voltage curve. In relation to different tensile stresses, particularly characteristic curve forms can be established at those time points at which the door leaf 4 is accelerated or braked since at these time points the drive belt 1 is stretched or contracts. As already mentioned, at the end positions of the load 3 (of the door leaf 4) abrupt changes of the motor voltage occur (cf. FIG. 4).

For the experimental validation, the opening and closing process of the said door was carried out five times consecutively for each frequency. The curves reproduced in FIGS. 3 and 4 accordingly reproduce the curves determined for each frequency.

Figure 3:
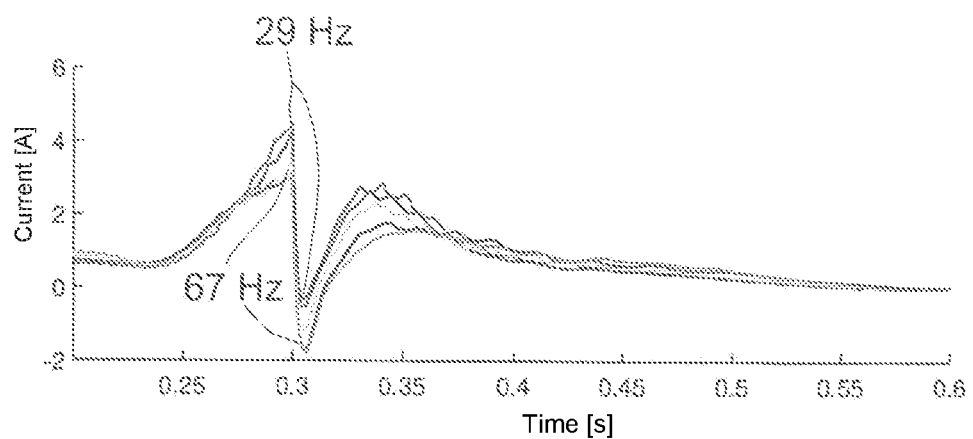
FIG. 3 shows motor current curves recorded during operation of a pivotable sliding door shortly before, during and after reaching a rest position of an appurtenant door leaf at different tensile stresses of the drive belt.
Figure 4:
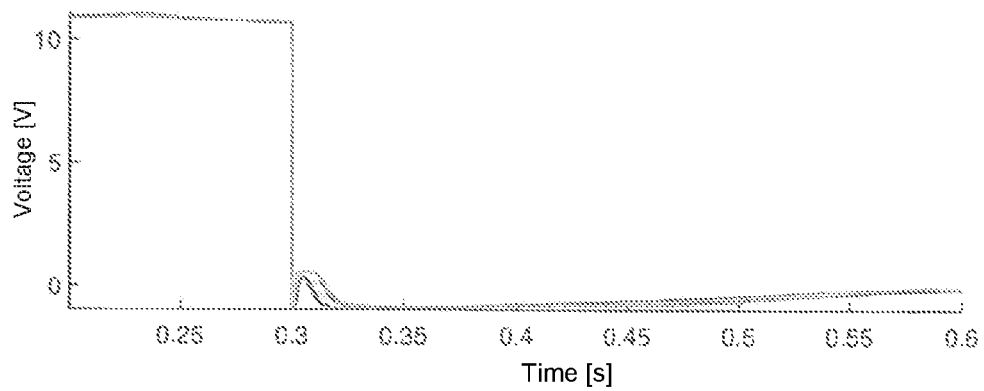
FIG. 4 shows motor voltage curves recorded during operation of a pivotable sliding door shortly before, during and after reaching a rest position of an appurtenant door leaf at different tensile stresses of the drive belt.

FIGS. 3 and 4 represent the motor current curve and the motor voltage curve shortly before, during and after reaching the rest state of the load 3, in particular the curves relate to the open end position of a door leaf pertaining to the BIDS Alstom X60B door. As reproduced in FIG. 4, the motor voltage changes abruptly from 11 V to 0 V on reaching the end position at a time point of 0.3 s. The remanent energy present in the door system induces from this time point a predominantly negative transient voltage which increases again after about 300 ms.

Upon reaching the open end position, the motor current increases (see FIG. 3, increase in the motor current from a time point of about 0.25 s). Shortly after interruption of the electrical circuit assigned to the drive unit, the motor current acquires negative values (see, for example, the region at 0.3 s; also designated as undershoot), which corresponds to regenerative operation. After about 20 ms, the current increases again into the positive range, experiences a local maximum (overshoot) and subsequently decreases to a motor current of zero. The present experimental measurement illustrate that the amplitude of the undershoot and overshoot depends on the elasticity or the deformation of the drive belt and on its damping characteristic. For reasons of clarity in the motor current curve shown in FIG. 3, a specific vibration frequency (29 Hz and 67 Hz) was only assigned to the motor current curves representing the maximum vibration values. The relevant maximum values in each case are characterized in FIG. 3 in the overshoot and undershoot range.

In this case, it can be ascertained that a drive belt 1 having lower tension (e.g. 29 Hz) in the undershoot range has a less strongly negative value (i.e. has a lower regenerative current) than a drive belt 1 having higher tension (e.g. 67 Hz with more strongly negative motor current values) since it acts comparably to a filter having a large time constant which smooths the variation of the movement but at the same time has a larger current product in relation to the energy stored by the drive belt 1 until the remanent energy is completely reduced. In the case of a larger belt tension, the drive belt 1 is stiffer and stores only a small proportion of the energy in the form of elastic energy. As a result the damping in generator mode is lower and higher negative currents occur. Corresponding to this, the positive peak (in the overshoot range) is lower since the remanent energy is also lower.

In both cases (lower and higher tensile stress), the remanent energy disappears after about 300 ms. The peak-to-peak difference (relative to the overshoot and undershoot range) is however very similar for both vibration frequencies (i.e. tension states). The form of the motor current curve varies according to the system elasticity resulting from different tensile stress and the present damping characteristic. It should further be noted that the overshoot amplitude is inversely proportional to the tensile stress of the drive belt 1.

As set out previously, predictions on the tensile stress forming the basis of the drive belt can be made by means of selected curve features of a motor current curve (for example, the amplitude in the overshoot or undershoot range or a corresponding amplitude difference). Using a suitable evaluation algorithm (for example, based on artificial intelligence), this information can be used to determine the tension of a drive belt. In particular using the method according to the disclosure, a tension status monitoring can be carried out during operation of a drive belt in a running electromechanical system (e.g. a door system).

The invention claimed is:

1. A method for determining the tension of a drive belt, wherein the drive belt is provided for transmission of a torque generated by a drive unit to a load, the method including the following steps:
   a. moving the load from a moving state into a rest state;
   b. recording the motor voltage during the execution of process step a. and preparing a time-resolved motor voltage curve;
   c. determining the motor current from the recorded motor voltage or the motor voltage curve and preparing a time-resolved motor current curve; and
   d. evaluating the time-resolved motor current curve and determining the tension of the drive belt by selected curve features of the motor current curve,
   wherein the evaluation is made in the course of process step d. by an algorithmic evaluation, which is based on selected curve features of the motor current curve, which characterize the motor current curve after reaching the load in the rest state.

2. The method according to claim 1, wherein the evaluation is based on curve features of the motor current curve which characterize the motor current curve in a state in which the circuit of the motor is interrupted.

3. The method according to claim 1, wherein the curve features of the motor current curve are selected from the curve slope, amplitude, amplitude difference, or further curve features configured to be determined mathematically or geometrically.

4. The method according to claim 1, wherein the method is executed during active operation of the drive belt and enables a continuous status monitoring of the tension of the drive belt.

5. A door system comprising a door leaf, a drive unit, a drive belt provided between the drive unit and the door leaf and a processing and control unit, wherein the drive belt is adapted to transmit a torque generated by the drive unit to the door leaf wherein the door system is adapted to execute the method according to claim 1.

6. The method according to claim 1, wherein the algorithmic evaluation is based on boundary conditions for the curve features of the motor current curve which define one or more tension states of the drive belt.

7. The method according to claim 6, wherein the boundary conditions relate to the curve behaviour or the curve shape, amplitude values, amplitude differences, or curve slopes in a predefined time interval after reaching the rest state.

8. The method according to claim 1, wherein the load comprises a door leaf of a single-leaf sliding door, a double-leaf sliding door, or a pivotable sliding door system.

9. The method according to claim 8, wherein the moving state relates to an opening or closing movement of the door leaf.

10. The method according to claim 8, wherein the rest state relates to an open state of the door leaf.

\* \* \* \* \*